(12) United States Patent
Hou et al.

(10) Patent No.: US 12,216,356 B2
(45) Date of Patent: Feb. 4, 2025

(54) DISPLAY DEVICE AND MOBILE TERMINAL

(71) Applicant: WUHAN CHINA STAR OPTOELECTRONICS TECHNOLOGY CO., LTD., Hubei (CN)

(72) Inventors: Shaojun Hou, Hubei (CN); Chao Wang, Hubei (CN); Guanghui Liu, Hubei (CN)

(73) Assignee: WUHAN CHINA STAR OPTOELECTRONICS TECHNOLOGY CO., LTD., Hubei (CN)

(*) Notice: Subject to any disclaimer, the term of this patent is extended or adjusted under 35 U.S.C. 154(b) by 0 days.

(21) Appl. No.: 17/754,382

(22) PCT Filed: Mar. 17, 2022

(86) PCT No.: PCT/CN2022/081335
§ 371 (c)(1),
(2) Date: Mar. 31, 2022

(87) PCT Pub. No.: WO2023/168736
PCT Pub. Date: Sep. 14, 2023

(65) Prior Publication Data
US 2024/0111188 A1 Apr. 4, 2024

(30) Foreign Application Priority Data
Mar. 10, 2022 (CN) .......................... 202210230007.7

(51) Int. Cl.
*G02F 1/1335* (2006.01)
*F21V 8/00* (2006.01)
*G02F 1/13357* (2006.01)

(52) U.S. Cl.
CPC ..... *G02F 1/133613* (2021.01); *G02B 6/0055* (2013.01); *G02B 6/0068* (2013.01);
(Continued)

(58) Field of Classification Search
CPC ......... G02F 1/133603; G02F 1/133613; G02F 1/133615; G02F 1/133524; G02F 1/133626
See application file for complete search history.

(56) References Cited

U.S. PATENT DOCUMENTS

2016/0245976 A1* 8/2016 Li ........................... G09F 13/00
2019/0306296 A1 10/2019 Cheng
2021/0294015 A1 9/2021 Yin

FOREIGN PATENT DOCUMENTS

CN 107784989 A 3/2018
CN 109814299 A 5/2019
(Continued)

OTHER PUBLICATIONS

International Search Report in International application No. PCT/CN2022/081335, mailed on Nov. 30, 2022.
(Continued)

*Primary Examiner* — Mariceli Santiago

(57) ABSTRACT

The present application provides a display device and a mobile terminal. The display device includes a display panel and a backlight module arranged on one side of the display panel. The display panel includes a first display area, a second display area arranged on one side of the first display area, and a third display area arranged within the second display area. The backlight module includes a via area, and the via area is arranged corresponding to the third display area. The backlight module includes a first light source
(Continued)

arranged corresponding to the first display area and a second light source arranged corresponding to the second display area.

15 Claims, 3 Drawing Sheets

(52) U.S. Cl.
CPC .. *G02F 1/133524* (2013.01); *G02F 1/133605* (2013.01); *G02F 1/133615* (2013.01)

(56) References Cited

FOREIGN PATENT DOCUMENTS

| | | |
|---|---|---|
| CN | 110456571 A | 11/2019 |
| CN | 112068356 A | 12/2020 |
| CN | 112346270 A | 2/2021 |
| CN | 113031346 A | 6/2021 |
| CN | 113744641 A | 12/2021 |
| JP | 3215833 U | 4/2018 |

OTHER PUBLICATIONS

Written Opinion of the International Search Authority in International application No. PCT/CN2022/081335, mailed on Nov. 30, 2022.

Chinese Office Action issued in corresponding Chinese Patent Application No. 202210230007.7 dated Nov. 21, 2022, pp. 1-10.

\* cited by examiner

DISPLAY DEVICE AND MOBILE TERMINAL

FIELD OF DISCLOSURE

The present application relates to a field of display technology, and in particular, to a display device and a mobile terminal.

DESCRIPTION OF RELATED ART

With continuous development of display technology and a demand for better display performance, there has been a trend toward terminal equipment (such as mobile phones, tablet computers, etc.) with high screen ratios. Because the terminal equipment has some functional devices (e.g., cameras and light sensors) which have light-receiving requirements, it is difficult to realize best screen ratios for display screens.

At present, besides narrow bezels, main solutions used to achieve high screen ratios are notch screens, water-drop screens, or hole-digging screens. However, this sacrifices part of a screen space, and light-receiving devices are directly exposed in the screen. Conventional techniques adopt an under-screen camera. The camera is generally arranged in a camera area at an edge or corner of the screen. The camera area has no pixel units or light sources and cannot be used to display images, which affects user experience. At present, there are full-screen solutions with lift-type cameras or slide phones on the market, but these solutions all require additional module structures or increase a device thickness, and users do not have ideal experiences.

The under-screen camera technology for liquid crystal displays (LCDs) needs to consider full-screen integral display performance and ensure good photo-shooting through hidden cameras of the display panels. Since a backlight module needs to have a via hole corresponding to the camera, light leakage at a via hole will affect the camera shooting quality. It is difficult for the under-screen camera technology to ensure the integral display performance while reducing light leakage at the via hole of the backlight module.

SUMMARY

The present application provides a display device and a mobile terminal, which can ensure integral display performance and reduce light leakage at a via hole of a backlight module.

The present application provides a display device, including:
  a display panel including a first display area, a second display area, and a third display area, wherein the second display area is arranged on one side of the first display area, and the third display area is arranged within the second display area; and
  a backlight module arranged on one side of the display panel, wherein the backlight module is provided with a via area, the via area is arranged corresponding to the third display area, and the backlight module includes a plurality of first light sources arranged corresponding to the first display area and a plurality of second light sources arranged corresponding to the second display area;
  wherein in a first state, the plurality of first light sources are turned on, and the plurality of second light sources are turned on; and in a second state, the plurality of first light sources are turned on, and the plurality of second light sources are turned off.

Optionally, in some embodiments of the present application, the backlight module further includes a light guide plate; in the light guide plate, a light propagation ability in a first direction is greater than a light propagation ability in a second direction; and in the second direction, the first display area is disposed on one side of the second display area, the first direction intersects with the second direction, the first direction and the second direction are parallel to a light emitting surface of the light guide plate.

Optionally, in some embodiments of the present application, the plurality of first light sources and the plurality of second light sources are disposed on one side of the light guide plate; the plurality of first light sources and the plurality of second light sources are arranged along the second direction; and the plurality of first light sources and the plurality of second light sources are disposed on a same side.

Optionally, in some embodiments of the present application, the light guide plate includes a light guide area and a light transmissive area, the light guide area is disposed corresponding to the first display area and the second display area, the light transmissive area is arranged corresponding to the third display area, and the light guide area is provided with a plurality of first microstructures.

Optionally, in some embodiments of the present application, on one side close to the display panel, the light guide plate includes a surface provided with the first microstructures.

Optionally, in some embodiments of the present application, on one side away from the display panel, the light guide plate includes a surface provided with the first microstructures.

Optionally, in some embodiments of the present application, the first microstructures include a plurality of grooves, the grooves are arranged at intervals along the first direction, and each of the groove extends along the second direction.

Optionally, in some embodiments of the present application, a cross-section of each first microstructure along the first direction is V-shaped or arc shaped.

Optionally, in some embodiments of the present application, light transmittance of the light transmissive area of the light guide plate is greater than light transmittance of the light guide area of the light guide plate.

Optionally, in some embodiments of the present application, the backlight module further includes a reflective film and an optical film, the reflective film is disposed on one side of the light guide plate away from the display panel, the optical film is disposed on one side of the light guide plate close to the display panel, a first via hole is defined in the reflective film, a second via hole is defined in the optical film, and the first via hole and the second via hole are defined corresponding to the light transmissive area.

Optionally, in some embodiments of the present application, the backlight module further includes a frame, the frame is disposed on one side of the reflective film away from the display panel, a third via hole is defined in the frame, and the third via hole is defined corresponding to the light transmissive area.

Optionally, in some embodiments of the present application, the first light sources and the second light sources are disposed on two opposite sides of the light guide plate in the first direction.

Optionally, in some embodiments of the present application, the backlight module includes the first light sources and the second light sources, and a buffer interval is present between the first light source closest to the second display area and the second light source closest to the first display area.

Optionally, in some embodiments of the present application, the buffer interval ranges from 1 millimeter (mm) to 5 mm.

Optionally, in some embodiments of the present application, the backlight module further includes a compensation backlight unit, the compensation backlight unit is disposed on one side of the light guide plate away from the display panel, and the compensation backlight unit is disposed corresponding to the third display area.

Optionally, in some embodiments of the present application, the compensation backlight unit includes a compensation light source, and the compensation light source is arranged in a ring shape.

Optionally, in some embodiments of the present application, the compensation backlight unit further includes a liquid crystal layer, a first electrode disposed on one side of the liquid crystal layer close to the display panel, and a second electrode disposed on one side of the liquid crystal layer away from the display panel; and the compensation light source surrounds the liquid crystal layer.

Optionally, in some embodiments of the present application, in the second direction, a width of the second display area is greater than a width of the third display area.

Optionally, in some embodiments of the present application, the width of the second display area ranges from 5 mm to 20 mm, and the width of the third display area ranges from 4 mm to 7 mm.

The present application further provides a mobile terminal, including an electronic component and the display device mentioned above, wherein the electronic component is arranged corresponding to the third display area.

Advantages of the Present Application

The present application adopts a display device and a mobile terminal. The display device includes a display panel and a backlight module. The display panel is divided into a first display area, a second display area arranged on one side of the first display area, and a third display area within the second display area. The third display area is an area corresponding to an electronic component (e.g., cameras and sensors). The backlight module is provided with a via area, and the via area is arranged corresponding to the third display area. The backlight module includes a plurality of first light sources arranged corresponding to the first display area and a plurality of second light sources arranged corresponding to the second display area. In a first state, the first light sources are turned on, and the second light sources are turned on. In a second state, the first light sources are turned on, and the second light sources are turned off. A camera is disposed corresponding to the via area and the third display area. When the camera is in operation, the first light sources are turned on to make the first display area display normally, and the second light sources are turned off, so that the second display area and the third display area do not display images. Accordingly, the present application can reduce light leakage of the backlight module and prevent camera shooting from being affected. When the camera is not in operation, the first light sources are turned on to enable the first display area to display normally, and the second light sources are turned on to enable the second display area and the third display area to display normally, thus achieving true full-screen display operations.

BRIEF DESCRIPTION OF DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without inventive work.

DETAILED DESCRIPTION OF EMBODIMENTS

Figure 1:
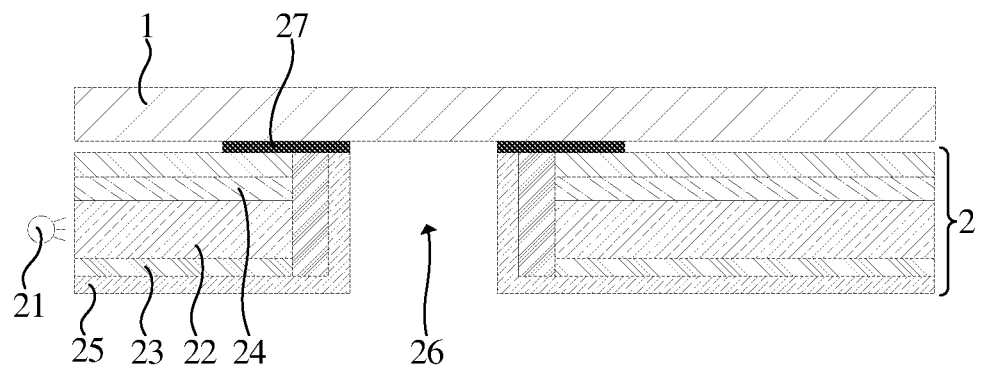
FIG. 1 is a schematic cross-sectional structural view of a display device according to one embodiment of the present application.

The technical solutions in the present application will be clearly and completely described below in conjunction with accompanying drawings and with reference to specific embodiments. Obviously, the embodiments are only some of the embodiments of the present application, rather than all the embodiments. Based on the embodiments in the present application, all other embodiments obtained by those skilled in the art without creative work shall fall within the protection scope of the present application. In addition, it should be understood that the specific embodiments described here are only used to illustrate and explain the present application, and are not used to limit the present application. In the present application, unless otherwise specified, directional terms such as "upper" and "lower" generally refer to the upper and lower directions of a device in actual use or work state, and specifically refer to the directions in the drawings. The terms "inner" and "outer" are referred to with respect to outlines of the device.

Please refer to FIG. 1. FIG. 1 is a schematic cross-sectional view of a display device and an electronic component according to prior art. A display panel 1 is disposed on a light emitting side of a backlight module 2, and the backlight module 2 includes a light source 21 and a light guide plate 22, a reflective film 23, an optical film 24, and a frame 25. The reflective film 23 is disposed on the frame 25, the light guide plate 22 is disposed on the reflective film 23, the optical film 24 is disposed on the light guide plate 22, and the light source 21 is disposed at a lateral side of the light guide plate 22. In order to realize under-screen camera technology, a via hole 26 corresponding to a camera is defined in the frame 25, the reflective film 23, the light guide plate 22, and the optical film 24. Moreover, the optical film 24 is bonded to the display panel 1 through a light-shielding adhesive 27, and the frame 25 is bent into the via hole 26, so as to prevent light leakage at the via hole 26 from affecting camera shooting. However, when the display device is displaying images, the light-shielding adhesive 27 and a sealant frame at the via hole 26 cause black borders.

Obviously, such a structure is not conducive to integral full-screen display performance.

The present application provides a display device and a mobile terminal. A detailed description is provided below. It should be noted that a description order of the following embodiments is not intended to limit a preferable order of the embodiments.

Figure 2:
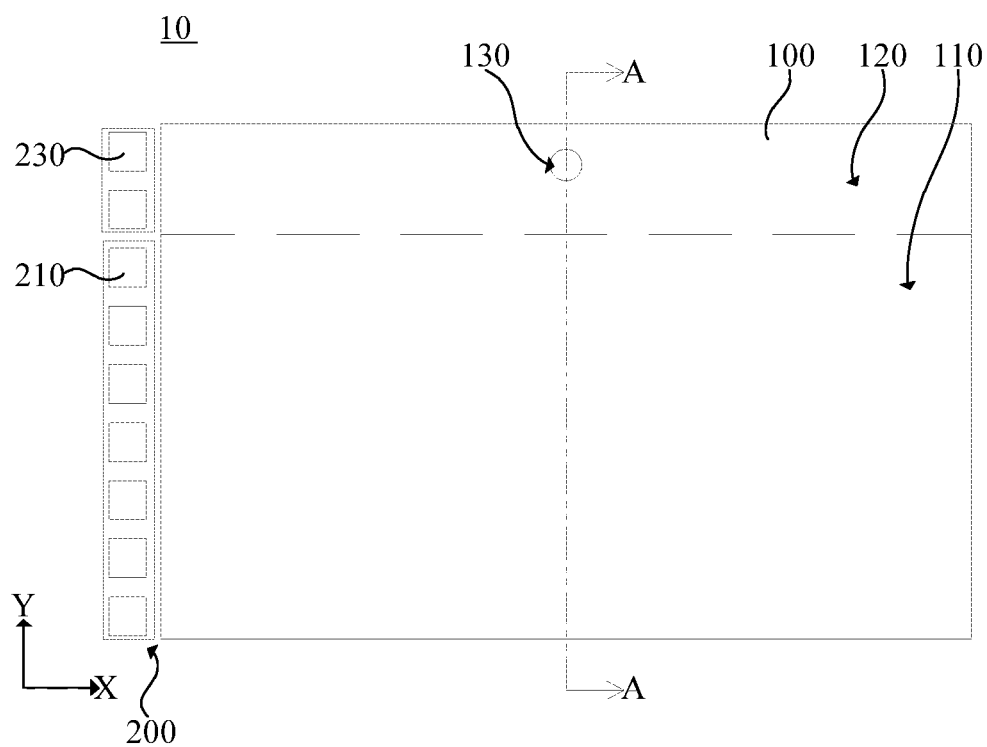
FIG. 2 is a schematic top view of a mobile terminal according to one embodiment of the present application.
Figure 3:
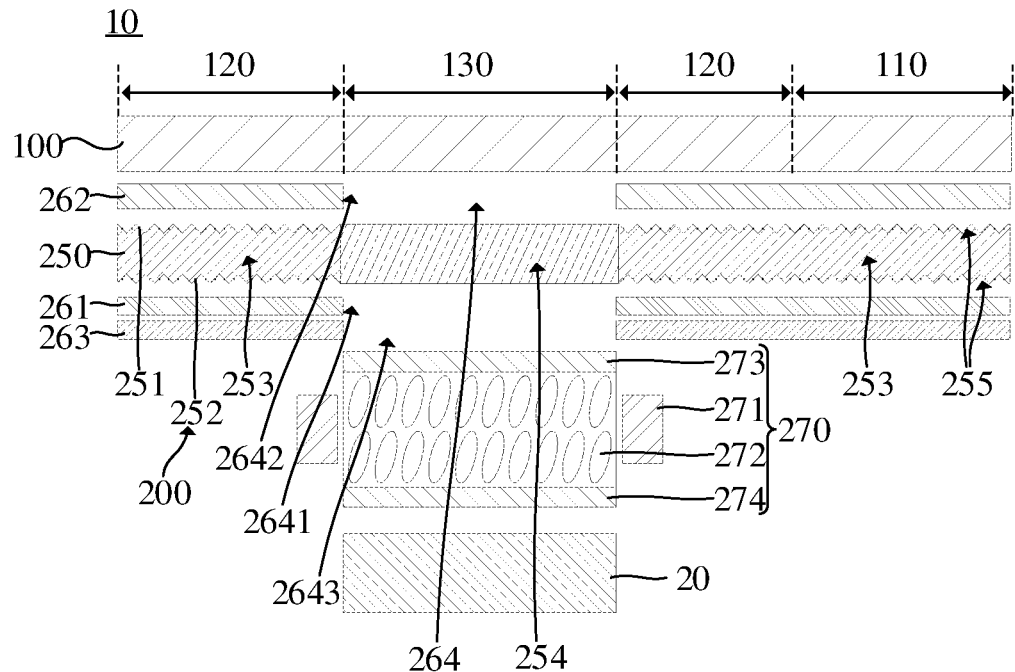
FIG. 3 is a schematic cross-sectional view taken along line A-A in FIG. 2.

Referring to FIGS. 2 and 3, the present application provides a display device 10 including a display panel 100 and a backlight module 200. The backlight module 200 is disposed on one side of the display panel 100. In the display device 10 of the present application, the display panel 100 can be a liquid crystal display panel, and the backlight module 200 provides a light source for the display panel 100.

Specifically, as shown in FIG. 2, the display panel 100 includes a first display area 110, a second display area 120, and a third display area 130. The second display area 120 is disposed on one side of the first display area 110, and the third display area 130 is disposed within the second display area 120. The second display area 120 surrounds at least a portion of the third display area 130. In the display device 10 of the present application, the third display area 130 is completely surrounded by the second display area 120. In other words, the second display area 120 surrounds the third display area 130. Certainly, the third display area 130 can be partially surrounded by the second display area 120 according to actual situation and specific requirements, and the present application is not limited in this regard.

Specifically, as shown in FIG. 2 and FIG. 3, the backlight module 200 is provided with a via area 264, and the via area 264 is disposed corresponding to the third display area 130. The backlight module 200 includes a plurality of first light sources 210 and a plurality of second light sources 230. The first light sources 210 are disposed corresponding to the first display area 110, and the first light sources 210 are used to provide a light source for the first display area 110. The second light sources 230 are disposed corresponding to the second display area 120, and the second light source 230 is used to provide a light source for the second display area 120. Since the third display area 130 is disposed in the second display area 120, the second light source 230 can also be used to provide a light source for the third display area 130.

In the display device 10 of the present application, in a first state, the first light sources 210 are turned on, and the second light sources 230 are turned on. In a second state, the first light sources 210 are turned on, and the second light sources 230 are turned off. When the display device 10 is used in a mobile terminal, the mobile terminal includes an electronic component 20 and the display device 10 of the present application. The third display area 130 and the via area 264 are disposed corresponding to the electronic component 20 (a camera, a sensor, etc.). When the camera is in operation, the first light sources 210 are turned on to make the first display area 110 display normally, and the second light sources 230 are turned off, so that the second display area 120 and the third display area 130 do not display images, which can reduce light leakage of the backlight module 200, and thereby prevent camera shooting from being affected by the light leakage. When the camera is not in operation, the first light sources 210 are turned on to enable the first display area 110 to display normally, and the second light sources 230 are turned on to enable the second display area 120 and the third display area 130 to display normally, so as to achieve a true full screen function. Compared with the prior art shown in FIG. 1, the display device 10 of the present application can reduce the light leakage at the via area 264 of the backlight module 200 while ensuring an integral display effect.

Figure 4:
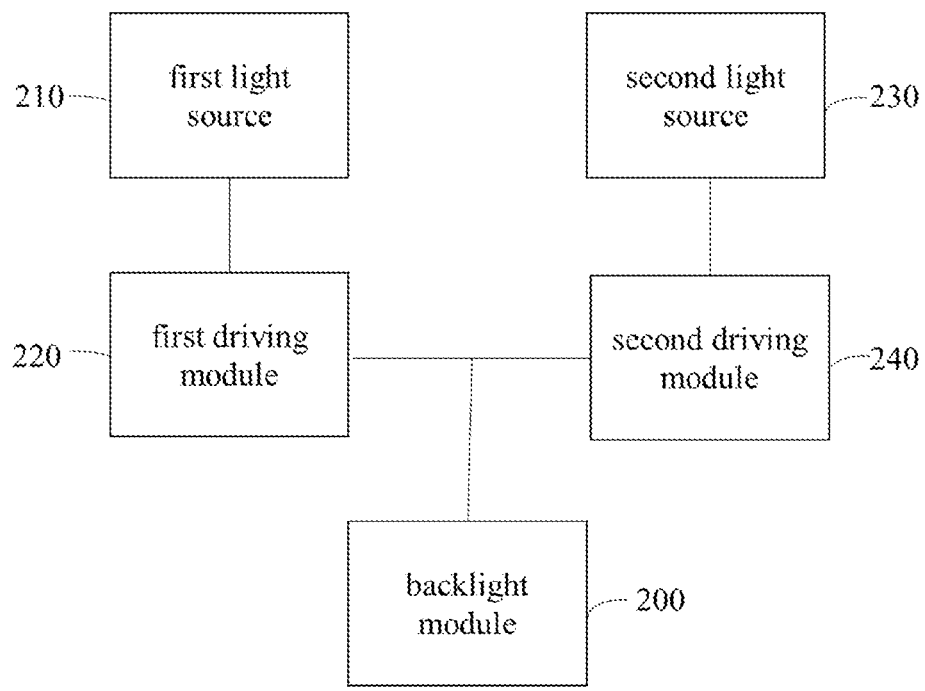
FIG. 4 is a schematic module diagram of the display device according to one embodiment of the present application.

Specifically, as shown in FIGS. 2 to 4, in the display panel 100 of the present application, the backlight module 200 further includes a first driving module 220 and a second driving module 240, and the first driving module 220 is electrically connected to the first light sources 210. The first driving module 220 is used to control the first light sources 210, and the first light source 210 can be turned on or off through the first driving module 220. The second driving module 240 is electrically connected to the second light sources 230, the second driving module 240 is used to control the second light source 230, and the second light sources 230 can be turned on or off through the second driving module 240. In the first state, the first driving module 220 turns on the first light sources 210, and the second driving module 240 turns on the second light sources 230. In the second state, the first driving module 220 turns on the first light sources 210, and the second driving module 240 turns off the second light sources 230.

In the display device 10 of the present application, the first light source 210 and the second light source 230 in the display device 10 are turned on by respective driving modules. When the camera is in operation, the first driving module 220 turns on the first light sources 210 to make the first display area 110 display normally, and the second driving module 240 turns off the second light sources 230, so that the second display area 120 and the third display area 130 do not display images, which can reduce the light leakage of the backlight module 200 and thereby prevent camera shooting from being affected. When the camera is not in operation, the first driving module 220 lights up the first light sources 210 to make the first display area 110 display normally, and the second driving module 240 lights up the second light sources 230 to make the second display area 120 and the third display area 130 display normally, thereby realizing true full-screen operations.

Specifically, the backlight module 200 further includes a light guide plate 250. In the light guide plate 250, a light propagation ability along the first direction X is greater than a light propagation ability along the second direction Y. That is to say, light has a strong light-gathering ability along the first direction X in the light guide plate 250, and light has a weak light-spreading ability along the second direction Y in the light guide plate 250. In the second direction Y, the first display area 110 is arranged on one side of the display area 120, the first direction X intersects with the second direction Y. This way, the light emitted by the second light sources 230 can be prevented from spreading to regions corresponding to the second display area 120 and the third display area 130 in the light guide plate 250.

Specifically, the first light sources 210 and the second light sources 230 are arranged on one side of the light guide plate 250. The first light sources 210 and the second light sources 230 are arranged along the second direction Y. The first light sources 210 and the second light source 230 are arranged on a same side. The first direction X and the second direction Y are both parallel to a light emitting surface of the light guide plate 250.

Specifically, according to the present application, in the second direction Y, a width of the second display area 120 is greater than a width of the third display area 130, thereby separating the third display area 130 from the first display area 110 to prevent backlight of the first display area 110 from spreading to the third display area 130. In the present application, the width of the second display area 120 ranges from 5 mm to 20 mm, and the width of the third display area 130 ranges from 4 mm to 7 mm Such configuration can prevent the backlight of the first display area 110 from spreading to the third display area 130.

Specifically, as shown in FIG. 3, the light guide plate 250 includes a light guide area 253 and a light transmissive area 254. The light guide area 253 is disposed corresponding to the first display area 110 and the second display area 120, and the light transmissive area 254 is disposed corresponding to the third display area 130. The light transmissive area 254 is disposed corresponding to the via area 264. The light guide plate 250 is provided with a plurality of first microstructures 255 for guiding the light to propagate along the first direction X. The microstructures 255 are disposed in the light guide area 253 and bypass the light transmissive area 254. In this structure, by arranging the first microstructures 255 on the light guide plate 250, the light can be guided to propagate along the first direction X, so that the light has a strong light-gathering ability along the first direction X in the light guide plate 250. Further, by making the first microstructures 255 bypass the light transmissive area 254, the light transmissive area 254 is not provided with the first microstructures 255, which can prevent the first microstructures 255 from affecting camera shooting.

Specifically, as shown in FIG. 3, on one side close to the display panel 100, a surface of the light guide plate 250 is a light emitting surface 251, and the light emitting surface 251 is provided with the first microstructures 255. By arranging the first microstructures 255 on the light emitting surface 251 of the light guide plate 250, the light can be guided to propagate along the first direction X, so that the light has a strong light-gathering ability along the first direction X in the light guide plate 250.

Specifically, as shown in FIG. 3, on one side away from the display panel 100, a surface of the light guide plate 250 is a bottom surface 252, and the bottom surface 252 is provided with the first microstructures 255. In this structure, by arranging the first microstructures 255 on the bottom surface 252 of the light guide plate 250, the light can be guided to propagate along the first direction X, so that the light has a strong light-gathering ability along the first direction X in the light guide plate 250.

In the display device 10 of the present application, the light emitting surface 251 and the bottom surface 252 of the light guide plate 250 are both provided with the first microstructures 255. Certainly, the first microstructures 255 can be provided on only one of the light emitting surface 251 or the bottom surface 252 according to actual situations and specific requirements, and the present application is not limited in this regard.

Figure 5:
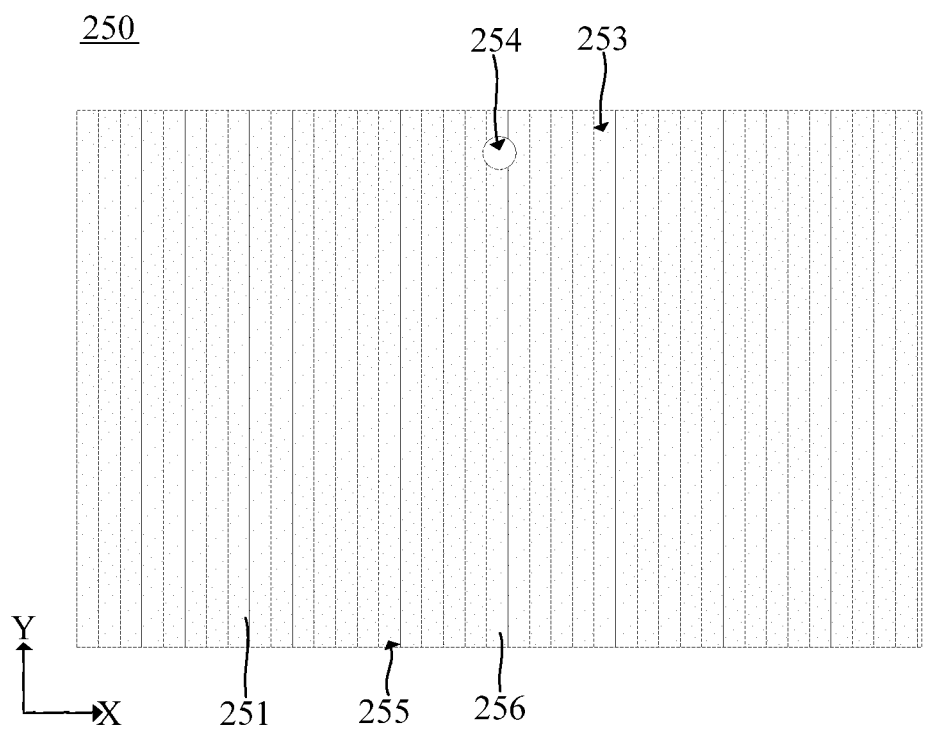
FIG. 5 is a schematic top view illustrating a light guide plate according to one embodiment of the present application.

Specifically, as shown in FIG. 3 and FIG. 5, the first microstructures 255 include a plurality of grooves arranged in sequence along the first direction X, and each groove extends along the second direction Y in a strip shape. By arranging the grooves extending along the second direction Y on the light guide plate 250, the light guide plate 250 has a strong light-gathering ability along the first direction X. It can be understood that, a specific structure of the first microstructure 255 can be appropriately modified according to actual situations and specific requirements, and the present application is not limited in this regard.

Specifically, as shown in FIG. 3, a cross-section of each first microstructure 255 along the first direction X can be V-shaped. Certainly, the cross-section of the first microstructure 255 along the first direction X can be appropriately modified according to actual situations and specific requirements. For example, the cross-section of each first microstructure 255 along the first direction X can be arc-shaped, and the present application is not limited in this regard.

Specifically, as shown in FIG. 5, in order to improve output light uniformity of the light guide plate 250, the light guide plate 250 is provided with a plurality of second microstructures 256 for scattering light. The second microstructures 256 are arranged bypassing the light transmissive area 254. By disposing the second microstructures 256 on the light guide plate 250, light can be scattered to thereby improve the output light uniformity of the light guide plate 250. By arranging the second microstructures 256 bypassing the light transmissive area 254, that is, the light transmissive area 254 is not provided with the second microstructures 256, the present application prevents the second microstructures 256 from affecting the camera shooting.

Specifically, the second microstructures 256 include a plurality of dots. By arranging the dots on the light guide plate 250, light can be scattered, thereby improving the output light uniformity of the light guide plate 250. It can be understood that, a specific structure of the second microstructure 256 can be appropriately modified according to actual situations and specific requirements, and the present application is not limited in this regard.

Specifically, as shown in FIG. 5, the light emitting surface 251 of the light guide plate 250 is provided with the second microstructures 256. By disposing the second microstructures 256 on the light emitting surface 251 of the light guide plate 250, light can be scattered, thereby improving the light output uniformity of the light guide plate 250.

Specifically, the bottom surface 252 of the light guide plate 250 is provided with second microstructures 256. By disposing the second microstructures 256 on the light emitting surface 251 of the light guide plate 250, light can be scattered, thereby improving the light output uniformity of the light guide plate 250.

In the display device 10 of the present application, the light emitting surface 251 and the bottom surface 252 of the light guide plate 250 are both provided with the second microstructures 256. Certainly, the second microstructures 256 can be provided on one of the light emitting surface 251 or the bottom surface 252 according to actual situations and specific requirements, and the present application is not limited in this regard.

Specifically, the first microstructures 255 and the second microstructures 256 are arranged bypassing the light transmissive area 254, so that light transmittance of the light transmissive area 254 of the light guide plate 250 is greater than light transmittance of the light guide area 253 of the light guide plate 250. In this structure, ambient light can pass through the light transmissive area 254 of the light guide plate 250 to reach the camera, thereby improving imaging quality of the camera.

Specifically, the light transmittance of the light transmissive area 254 of the light guide plate 250 is greater than or equal to 80%. Accordingly, the light transmittance of the light transmissive area 254 of the light guide plate 250 is high, so that ambient light can pass through the light transmissive area 254 of the light guide plate 250 to reach the camera, thereby effectively improving the imaging quality of the camera.

In the display device 10 of the present application, the light transmittance of the light transmissive area 254 of the light guide plate 250 can be 80%, 81%, 82%, 83%, 84%, 85%, 86%, 87%, 88%, 89%, 90%, 91%, 92%, 93%, 94%, 95%, 96%, 97%, 98%, 99%, or 99.9%. Certainly, the light transmittance of the light transmissive area 254 of the light guide plate 250 can be adjusted appropriately, and the present application is not limited in this regard.

Specifically, as shown in FIG. 3, the backlight module 200 further includes a reflective film 261 and an optical film 262. The reflective film 261 is disposed on one side of the light guide plate 250 away from the display panel 100, and the optical film 262 is disposed on one side of the light guide plate 250 close to the display panel 100. The reflective film 261 is provided with a first via hole 2641, and the optical film 262 is provided with a second via hole 2642. The first via hole 2641 and the second via hole 2642 are arranged corresponding to the light transmissive area 254. The arrangement of the reflective film 261 and the optical film 262 can improve light output efficiency of the backlight module 200. Further, by arranging the first and second via holes 2641 and 2642 in the reflective film 261 and the optical film 262, the camera can receive ambient light normally.

Specifically, the optical film 262 can include at least one of a diffuser sheet, a brightness enhancement sheet, or a prism sheet. Certainly, the optical film 262 can also include other films according to actual situations and specific requirements, and the present application is not limited in this regard.

Specifically, as shown in FIG. 3, the backlight module 200 further includes a frame 263. The frame 263 is disposed on one side of the reflective film 261 away from the display panel 100. The frame 263 is provided with a third via hole 2643. The third via hole 2643 is disposed corresponding to the light transmissive area 254. By arranging the third via hole 2643 in the frame 263, the camera can receive ambient light normally. In this embodiment, the frame 263 can be, but not limited to, an iron frame.

Figure 6:
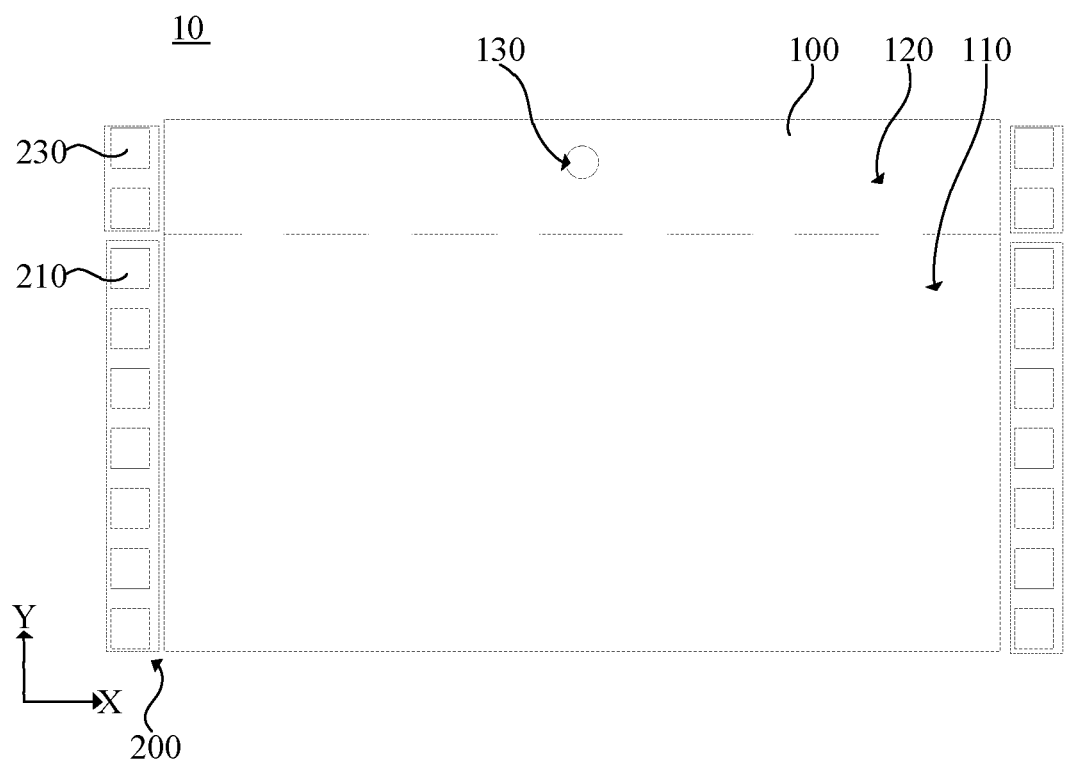
FIG. 6 is a schematic top view illustrating the mobile terminal according to another embodiment of the present application.

Specifically, as shown in FIGS. 3 and 6, the first light sources 210 and the second light sources 230 are disposed on two opposite sides of the light guide plate 250 along the first direction X. That is to say, on the two opposite sides of the light guide plate 250 along the first direction X, the first light sources 210 and the second light sources 230 are disposed. By arranging the first light sources 210 and the second light sources 230 on the two opposite sides of the light guide plate 250, light output quality of the backlight module 200 can be improved.

Specifically, as shown in FIG. 2, when the first light sources 210 are turned on, and the second light sources 230 are turned off, light emitted by the first light sources 210 may spread to the second display area 120 and the third display area 130. This will cause light leakage from the third display area 130 and affect normal operations of the electronic component 20. In order to improve or solve the above problems, a buffer interval is present between the first light source 210 closest to the second display area 120 and the second light source 230 closest to the first display area 110, and the buffer interval is used to prevent the light from the first light sources 210 from spreading to the second display area 120 and the third display area 130.

Specifically, in the display device 10 of the present application, the buffer interval can be 1 mm to 5 mm. For example, the buffer interval may be 1 mm, 1.5 mm, 2 mm, 2.5 mm, 3 mm, 3.5 mm, 4 mm, 4.5 mm, or 5 mm. It can be understood that specific values of the buffer interval can be adjusted appropriately according to actual situations and specific requirements, and the present application is not limited in this regard.

Specifically, the backlight module 200 can include multiple first light sources 210, and the first light sources 210 can provide light sources for the first display area 110. The first light sources 210 can be electrically connected to the same first driving module 220. The first light sources 210 are simultaneously turned on or off through the same one first driving module 220. Certainly, one first light source 210 can also be arranged corresponding to one first driving module 220. That is to say, the first light sources 210 are arranged in one-to-one correspondence with multiple first driving modules 220. Each first light source 210 is electrically connected to one first driving module 220, and each first driving module 220 is used for turning on or off one first light source 210. In this embodiment, a distribution spacing of the first light sources 210 can be 1 mm to 5 mm That is to say, the spacing between two adjacent first light sources 210 can be 1 mm to 5 mm.

Similarly, the backlight module 200 can include multiple second light sources 230, and the multiple second light sources 230 can provide light sources for the second display area 120 and the third display area 130. The second light sources 230 can be electrically connected to the same second driving module 240. The second light sources 230 can be simultaneously turned on or off through one second driving module 240. Certainly, one second light source 230 can also be arranged corresponding to one second driving module 240. That is to say, the multiple second light sources 230 are arranged in one-to-one correspondence with multiple second driving modules 240, each second light source 230 is electrically connected to one second driving module 240, and each second driving module 240 is used for lighting or extinguishing one second light source 230. In this embodiment, a distribution spacing of the second light sources 230 can be 1 mm to 5 mm That is to say, the spacing between two adjacent second light sources 230 can be 1 mm to 5 mm Specifically, in order to make the first display area 110 receive uniform backlight, the distribution spacing of the first light sources 210 can be adjusted. In this embodiment, the distribution spacing of the first light sources 210 is smaller than the buffer interval. Accordingly, the backlight received by the first display area 110 is more uniform, and the light from the first light source 210 can be prevented from spreading to the second display area 120 and the third display area 130.

Specifically, in order to make the second display area 120 and the third display area 130 receive uniform backlight, the distribution spacing of the second light sources 230 can be adjusted. In this embodiment, the distribution spacing of the second light sources 230 is smaller than the buffer interval, so that the backlight received by the second display area 120 and the third display area 130 is more uniform.

Specifically, since the first microstructures 255 bypass the light transmissive area 254, a portion of the light guide plate 250 corresponding to the second display area 120 has poor light-output brightness and uniformity. In order to improve the above problems, the distribution spacing of the first light sources 210 can be larger than the distribution spacing of the second light sources 230, thereby improving the light-output brightness and uniformity of the portion of the light guide plate 250 corresponding to the second display area 120.

Specifically, as shown in FIG. 3, the backlight module 200 further includes a compensation backlight unit 270. The compensation backlight unit 270 is disposed on one side of the light guide plate 250 away from the display panel 100, and the compensation backlight unit 270 is disposed corresponding to the third display area 130 of the display panel 100. The compensation backlight unit 270 is used to provide a light source for the third display area 130. By adding the compensation backlight unit 270, compensation backlight can be provided for the third display area 130 of the display panel 100, which is beneficial to realize high-quality full-screen display. In this embodiment, the compensation backlight unit 270 is arranged on one side of the iron frame away from the display panel 100. Certainly, a specific position of the compensation backlight unit 270 can be modified appropriately according to actual situations and specific requirements, as long as the compensation backlight unit 270 is located on a light incident side of the display panel 100; and the present application is not limited in this regard.

Specifically, as shown in FIG. 3, the compensation backlight unit 270 includes a compensation light source 271. The compensation light source 271 is arranged in a ring shape, so that the camera can receive ambient light through an opening in a middle of the compensation light source 271. In the display device 10 of the present application, the compensation light source 271 can be electrically connected to the second driving module 240, so that the second driving module 240 can turn on or off the second light source 230 and the compensation light source 271 at the same time. Certainly, the compensation light source 271 can also be electrically connected to other driving modules according to actual situations and specific requirements, as long as the compensation light source 271 and the first light source 210 can be separately driven and controlled; and the present application is not limited in this regard.

Specifically, as shown in FIG. 3, the compensation backlight unit 270 further includes a liquid crystal layer 272, a first electrode 273 disposed on one side of the liquid crystal layer 272 close to the display panel 100, and a second electrode 274 disposed on one side of the liquid crystal layer 272 away from the display panel 100. The compensation light source 271 surrounds the liquid crystal layer 272. By changing a voltage difference between the first electrode 273 and the second electrode 274, a tilt angle in the liquid crystal layer 272 is changed, so that the liquid crystal layer 272 is switched between a transparent state and a foggy state. When the liquid crystal layer 272 is in the foggy state, light emitted by the compensation light source 271 is refracted by the foggy liquid crystal layer 272 and irradiated to the third display area 130 of the display panel 100, thereby realizing the full-screen display of the display panel 100.

Specifically, the first light source 210, the second light source 230, and the compensation light source 271 can be light-emitting diodes (LEDs). Certainly, the first light source 210, the second light source 230, and the compensation light source 271 can also be other light emitting elements according to actual situations and specific requirements; and the present application is not limited in this regard.

Specifically, as shown in FIG. 2, in the display device 10 of the present application, the display panel 100 is rectangular shaped, and the third display area 130 is located in a middle of a top of the display panel 100. Certainly, a specific position of the third display area 130 can be adjusted appropriately according to the actual situations and specific requirements. For example, the third display area 130 can be located on one side of the display panel 100 close to the second light source 230, and the present application is not limited in this regard.

Please refer to FIG. 2, FIG. 3, and FIG. 6. The present application further provides a mobile terminal. The mobile terminal can be a mobile phone, a tablet computer, a notebook computer screen, a desktop display, a television (TV), an in-vehicle display screen, and other devices. The mobile terminal includes the electronic component 20 (a camera, a sensor, etc.) and the above-mentioned display device 10. The electronic component 20 is disposed corresponding to the third display area 130. Since the mobile terminal of the present application includes the technical solutions of all the above-mentioned embodiments, the mobile terminal has the advantages of all the above-mentioned technical solutions, which is not repeated herein.

In the present application, the electronic component 20 is disposed on one side of the backlight module 200 away from the display panel 100, and can be located on one side of the compensation backlight unit 270 away from the display panel 100. Certainly, a specific position of the electronic component 20 can be adjusted appropriately according to actual situations and specific requirements, as long as the electronic component 20 can be disposed corresponding to the third display area 130; and the present application is not limited in this regard.

The above describes in detail the display device and the mobile terminal according to the embodiments of the present application. Specific examples are used in the present disclosure to illustrate working principles and embodiments of the present application. The description of the above embodiments is only for ease of understanding the method and main ideas of the present application. According to the idea of the present application, those skilled in the art can change the embodiments and the range of application. In summary, the content of this specification should not be construed as a limitation to the present application.

What is claimed is:

1. A display device, comprising:
a display panel comprising a first display area, a second display area, and a third display area, wherein the second display area is arranged on one side of the first display area, and the third display area is arranged within the second display area; and
a backlight module arranged on one side of the display panel, wherein the backlight module is provided with a via area, the via area is arranged corresponding to the third display area, and the backlight module comprises a plurality of first light sources arranged corresponding to the first display area and a plurality of second light sources arranged corresponding to the second display area;
wherein in a first state, the first light sources are turned on, and the second light sources are turned on; and in a second state, the first light sources are turned on, and the second light sources are turned off;
wherein the first light sources and the second light sources are disposed on one side of the light guide plate, the first light sources and the second light sources are arranged along the second direction, and the first light sources and the second light sources are disposed on a same side;
wherein the backlight module further comprises a light guide plate and a compensation backlight unit, the compensation backlight unit is disposed on one side of the light guide plate away from the display panel, and the compensation backlight unit is disposed corresponding to the third display area;
wherein the compensation backlight unit comprises a compensation light source and a liquid crystal layer, the compensation light source is arranged in a ring shape, a first electrode disposed on one side of the liquid crystal layer close to the display panel, a second electrode disposed on one side of the liquid crystal layer away from the display panel, and the compensation light source surrounds the liquid crystal layer;
in the light guide plate, a light propagation ability in a first direction is greater than a light propagation ability in a second direction; and in the second direction, the first display area is disposed on one side of the second display area, the first direction intersects with the second direction, and the first direction and the second direction are parallel to a light emitting surface of the light guide plate.

2. The display device according to claim 1, wherein the light guide plate comprises a light guide area and a light transmissive area, the light guide area is disposed corresponding to the first display area and the second display area, the light transmissive area is arranged corresponding to the third display area, and the light guide area is provided with a plurality of first microstructures.

3. The display device according to claim 2, wherein on one side of the light guide plate close to the display panel, the light guide plate comprises a surface provided with the first microstructures.

4. The display device according to claim 2, wherein on one side of the light guide plate away from the display panel, the light guide plate comprises a surface provided with the first microstructures.

5. The display device according to claim 2, wherein the first microstructures comprise a plurality of grooves, the grooves are arranged at intervals along the first direction, and each of the groove extends along the second direction.

6. The display device according to claim 5, wherein a cross-section of each first microstructure along the first direction is V-shaped or arc shaped.

7. The display device according to claim 2, wherein light transmittance of the light transmissive area of the light guide plate is greater than light transmittance of the light guide area of the light guide plate.

8. The display device according to claim 2, wherein the backlight module further comprises a reflective film and an optical film, the reflective film is disposed on one side of the light guide plate away from the display panel, the optical film is disposed on one side of the light guide plate close to the display panel, a first via hole is defined in the reflective film, a second via hole is defined in the optical film, and the first via hole and the second via hole are defined corresponding to the light transmissive area.

9. The display device according to claim 8, wherein the backlight module further comprises a frame, the frame is disposed on one side of the reflective film away from the display panel, a third via hole is defined in the frame, and the third via hole is defined corresponding to the light transmissive area.

10. The display device according to claim 1, wherein the first light sources and the second light sources are disposed on two opposite sides of the light guide plate in the first direction.

11. The display device according to claim 1, wherein the backlight module comprises the first light sources and the second light sources, and a buffer interval is present between the first light source closest to the second display area and the second light source closest to the first display area.

12. The display device according to claim 11, wherein the buffer interval ranges from 1 millimeter (mm) to 5 mm.

13. The display device according to claim 1, wherein in the second direction, a width of the second display area is greater than a width of the third display area.

14. The display device according to claim 13, wherein the width of the second display area ranges from 5 mm to 20 mm, and the width of the third display area ranges from 4 mm to 7 mm.

15. A mobile terminal, comprising an electronic component and the display device of claim 1, wherein the electronic component is arranged corresponding to the third display area.

* * * * *